United States Patent [19]

Le Roux

[11] Patent Number: 5,191,193
[45] Date of Patent: Mar. 2, 1993

[54] SYSTEM OF PAYMENT OR INFORMATION TRANSFER BY MONEY CARD WITH ELECTRONIC MEMORY

[75] Inventor: Jean-Yves Le Roux, Bouc Bel Air, France

[73] Assignee: Gemplus Card International, Gemenos, France

[21] Appl. No.: 594,862

[22] Filed: Oct. 9, 1990

[30] Foreign Application Priority Data

Oct. 13, 1989 [FR] France .................. 89 13449

[51] Int. Cl.⁵ .................. G06K 5/00; G06F 15/30
[52] U.S. Cl. .................. 235/379; 235/380
[58] Field of Search ............ 235/380, 381, 382, 382.5, 235/379; 380/23, 29

[56] References Cited

U.S. PATENT DOCUMENTS

| | | | |
|---|---|---|---|
| 3,786,421 | 1/1974 | Wostl et al. | 235/380 |
| 4,304,990 | 12/1981 | Atalla | 235/380 |
| 4,562,341 | 12/1985 | Ohmae et al. | 235/380 |
| 4,700,055 | 10/1987 | Kashkashian, Jr. | 235/380 |
| 4,812,628 | 3/1989 | Boston | 235/380 |
| 4,851,650 | 7/1989 | Kitude | 235/380 |
| 4,882,473 | 11/1989 | Bergen et al. | 235/380 |
| 4,982,323 | 1/1991 | Nakamura | 235/380 |

FOREIGN PATENT DOCUMENTS

| | | |
|---|---|---|
| 0257596 | 3/1988 | European Pat. Off. . |
| 0305004 | 3/1989 | European Pat. Off. . |
| 3211568 | 10/1983 | Fed. Rep. of Germany . |
| 3406615 | 8/1984 | Fed. Rep. of Germany . |
| 2386080 | 10/1978 | France . |
| 2143355 | 2/1985 | United Kingdom . |
| 2154346 | 9/1985 | United Kingdom . |

Primary Examiner—John W. Shepperd
Assistant Examiner—Edward Sikorsky
Attorney, Agent, or Firm—Roland Plottel

[57] ABSTRACT

To avoid the need for making microprocessor-fitted bank cards which, although they cost little, are in a relatively far too expensive range, money cards with only memory zones are made. They then have four memory zones, one zone pertaining to the identity of the bearer or to that of the card, one zone pertaining to the financial balance, a third zone pertaining to an interaction counter. This interaction counter counts the number of financial operations performed with the card. A fourth zone includes a certificate. This certificate is prepared, in each reader that performs a transaction with the card, with a DES algorithm. The value of this certificate is a function, according to an algorithm common to all the readers, of the identity, the content of the interaction counter and the balance. When a new operation is performed with the card, it is ascertained beforehand that the content of the certificate is the same as the one that can be recomputed by any terminal provided with the same algorithm.

6 Claims, 2 Drawing Sheets

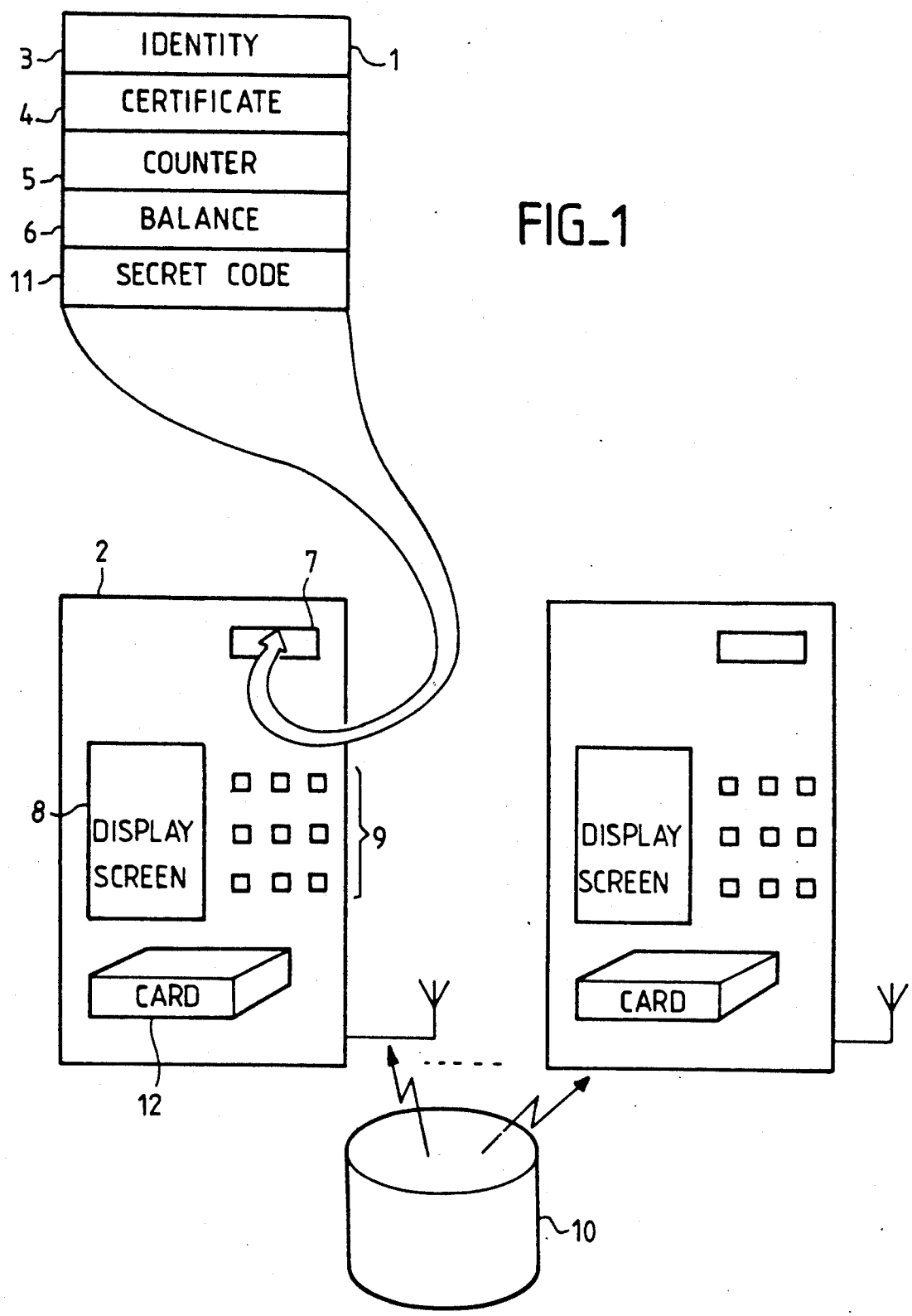

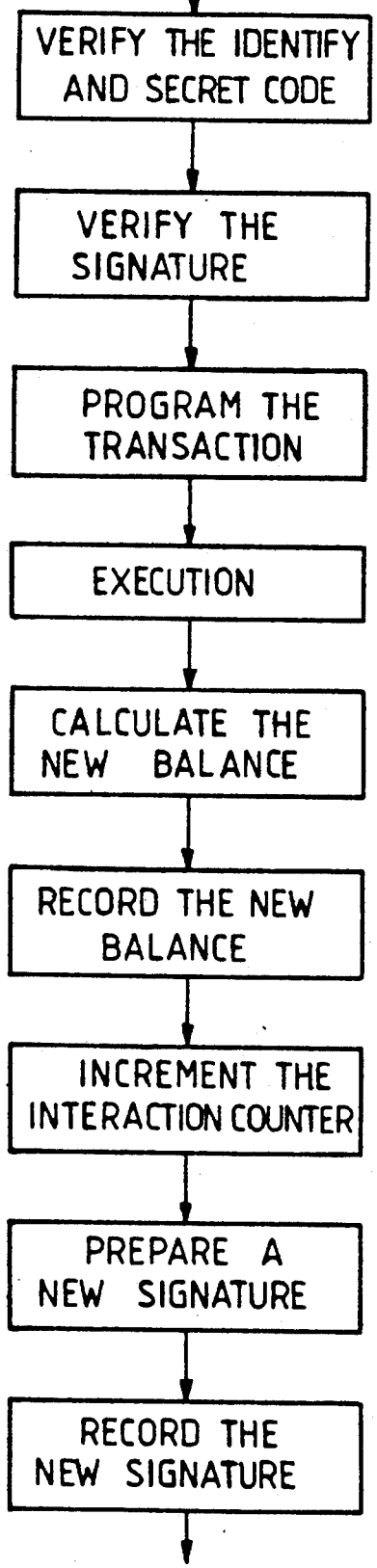

SYSTEM OF PAYMENT OR INFORMATION TRANSFER BY MONEY CARD WITH ELECTRONIC MEMORY

BACKGROUND OF THE INVENTION

1. Field of the Invention

An object of the present invention is a system of payment by a money card or money-holding "wallet" card with electronic memory. It concerns essentially the field of computerized money systems where, to prevent the theft of money and also, above all, to simplify banking operations, electronic type payments are used by means of memory cards. It can be applied, however, in other fields, especially when pieces of digital information have to be conveyed, and when it is necessary to prevent the modification (or at least to know whether such modification has taken place) of these pieces of information between the place from which they have been transmitted by a transmitter and the instant when they are received by their true addressee.

2. Description of the Prior Art

There are known electronic type payment systems where a chip card is used. The chip card is characterized essentially by the presence of a microprocessor. In this card, the microprocessor fulfils an obvious role of security. In effect, in a card such as this, a microprocessor such as this is capable of applying a complex algorithm for computing or verifying a secret code from a piece of identification data indicated to it. After this chip card has been introduced into a reader, if the secret code computed is not equivalent to secret code already contained in the card, it becomes impossible to perform an operation with this card, it being known that, in this case, the piece of identification data is false. In one improvement, the number of operations or attempts made to arrive at the right secret code is even limited. For example, beyond three operations, the chip card falls into an output slot behind the chip card reader. It is not even restored to its user.

This system is satisfactory, especially in view of the use of DES (data encryption standard) type algorithms, the complexity of which is such that a fraudulent individual would need to work on them for several years in order to take their mechanism apart. The drawback of these chip cards, however, is that they must include the microprocessor and that, ultimately, their cost is then very high.

In the invention, these problems are resolved by the use of a memory card that does not necessarily have any microprocessor. Essentially, the memory card has different types of zone: at least four different types of zones. These zones may possibly be made by different technologies (EPROM, EEPROM etc.), provided that they are not volatile. In a simplified way, the memory card of the invention even has zones that are all entirely readable. Only one of them is not re-recordable. It is a so-called identity zone, pertaining to the specific identity of the card, designed to prevent two cards from being totally identical, with one of them being a clone of the other by duplication. The following is the principle of the invention.

It is considered that, when a user uses his card and performs, for example, a banking operation, this operation can be counted. It is known, besides, that the object of a banking operation is to modify a balance. Besides, since the card is customized, it has specific indications concerning the identity of its bearer. As the case may be, the card may also have a secret access code known to the user. Under these conditions, each time the card is used, in the invention a digital signature is computed. This digital signature depends on the identity, the balance and the number of the banking operation performed. This identity, balance and number are furthermore recorded in three distinct zones of the card. This signature, which takes the form of a binary sequence of logic states, is also recorded in a particular zone of the memory card in the form of a certificate.

During a following operation, after standard operations, if necessary, for the validation of the bearer (wherein the bearer indicates his secret code and a reader ascertains that this secret code really corresponds to a secret code recorded in the card), the reader is made to compute a signature from the balance, the identity and the number of the operation recorded in the card. This computation of this signature is the same as the one that was likely to have been done at the time of recording of the signature as a certificate. Consequently, it can be ascertained that the new signature prepared is really the same one, or at least that it corresponds to the one recorded in the card.

If this is the case, an additional banking operation is authorized. At the end of this additional banking operation, a new signature is prepared from the new balance, the identity and the number of the new operation which, in the meantime, has been incremented by one unit to take account of the operation that has just been performed. This new signature is then recorded as a new certificate in the memory card, preferably in the place of the former one. Of course, the reader that computes the signature is provided with a indeciperable computation algorithm, preferably of the DES type. The result thereof is that, in this way, the same level of security is attained as with microprocessor-based cards, but that the cards concerned are now only memory cards containing only memory zones, without necessarily including the microprocessor. They are less expensive.

SUMMARY OF THE INVENTION

An object of the invention, therefore, is a system of payment by electronic memory money cards comprising memory money cards and one or more interaction terminals to interact on financial balances recorded in these cards, wherein:
these memory cards include at least four different memorizing zones: an identity zone, a balance zone, an interaction counter zone and a certificate zone,
and wherein the terminals include means designed, before each interaction, to:
  prepare a signature from the balance, the content of the counter, and the identity,
  ascertain that this signature corresponds to a certificate recorded in the certificate zone of the card,
and wherein this system further includes means designed, at each interaction, to:
  modify the balance,
  increment the content of the interaction counter,
  prepare a new signature as a function balance, the new content of the interaction counter and the identity,
  and record the new signature as a new certificate in the certificate zone.

In one application where it is no longer financial transactions but transfers of information that are to be performed, the system will be a transfer system, and its security characteristics will stay the same. In this latter case, the terminals may be differentiated into those that are only readers and those that are only recorders.

BRIEF DESCRIPTION OF THE DRAWINGS

The invention will be understood more clearly from the following description and from the accompanying figures. These figures are given purely by way of an indication and in no way restrict the scope of the invention. Of these figures:

FIG. 1 shows a schematic view of the system of the invention;

FIG. 2 is a chart showing the different steps of verification and recording performed by a reader on the memory card of the invention.

DESCRIPTION OF A PREFERRED EMBODIMENT

FIG. 1 shows a system of payment by memory money card according to the invention. Although it is the banking application that is described herein, it will be easily understood that the invention can be transposed to information transfers in general, a financial balance being a particular piece of information in itself. This system has memory money cards such as the card 1. This card 1 is designed to be introduced into a reader 2, or interaction terminal. This interaction terminal is designed to interact with financial balances recorded in the card 1. When the operations are being conducted with tradesmen, in principle when purchases are being made, the financial balance should decrease. By contrast, when the bearer of the card goes to his bank he can fill his "wallet" with the total amount of his balance, or with an amount that he may determine by choice.

The memory cards of the invention include essentially four zones. A first zone 3 is used to record an identity. This identity may correspond to the name and address of the bearer. It is specific to the card. No card may possess the same identity as another one. This identity may correspond to the name and address of the bearer. It is specific to the card. No card may have the same identity as another one. The zone 3 can only be read. Since this card then cannot be recorded on, an already-known identity is thus prevented from being duplicated thereon. This identity is recorded in memory cells of the memory zone 3. In a preferred way, the memory cells of the first zone 3 are non-erasable cells of the EPROM type. The cells of the other zones are preferably electrically erasable EEPROM type cells.

The second memory zone 4 includes a pre-recorded certificate. The zone 4 can be read and written on as many times as desired. A third zone 5 concerns an interaction counter. The information content that is in the zone 5 provides information on the number of operations performed with the card from the start of the lifetime of this card. The counter indication can neither be reset at zero nor get decremented. When the counter reaches its maximum, the card is no longer usable, and it has to be changed. The decrementation is prevented by the security mechanism of the component itself. For example, preferably, the counter zone 5 is of the token type: the tokens can only be used up. In this case, it is of the EPROM type. Nevertheless, it can be of the electrically erasable EEPROM type, but it is then associated with a counter to count the number of erasures and this counter is then of the EPROM type. The zone 5 can also be read and written at will. Finally, the card 1 includes at least one fourth zone 6 which concerns the financial balance, the money that the bearer may have at his disposal.

These four zones may each be formed, in practice, by a restricted number of simple memory cells. The whole content may correspond to some hundreds of bits. The identity secret code may be contained in some tens of bits. The signature and the balance may have a smaller logic size. As for the counter, it will preferably be replaced by a counting indicator. The counting and incrementation operations are then performed by the microprocessor of the reader. The balance zone may be a token zone but it preferably has a clear indication of the balance in an EEPROM type zone. Without this being an imperative, the card 1 may also have a fifth zone 11 containing a secret access code known to the bearer of the card.

Referring to FIG. 2, we shall now describe the operations performed with the memory card 1 when the bearer makes a purchase from a tradesman having a reader such as 2, adapted to the management of these new memory cards. The operations are managed in a known way by a microprocessor contained in the terminal 2. When the purchase is determined, the bearer of the card introduces his card into a reading slot 7 of the reader/recorder terminal 2. In a first operation, the reader 2 seeks to recognize the bearer. Here, the reader 2 transmits questions, in a known way, on to the display screen 8. These questions ask the holder to enter his secret code. He can do so by means of a keyboard 9 connected to the reader. The code entered by the bearer is compared with the secret code contained in the zone 11 of the card. When the comparison operation is done successfully, a fresh verification is performed.

In this verification, the reader 2 uses the pieces of digital data representing the identity (contained in the zone 3), the state of the interaction counter (contained in the zone 5) and the state of the balance (contained in the zone 6) to prepare a signature. This signature is entered by the reader applying a DES type algorithm carried out by a DES operator (FIG. 1). As soon as the reader 2 has prepared this signature, it compares it with the signature already recorded beforehand as a certificate in the card and currently stored in the zone 4 of the card 1. To do this, the reader reads the content of the zone 4 and compares it in its logic comparator with the signature that it has just computed. If the comparison shows that the two signatures are equal, it is possible to pass on to the purchasing operation itself.

In this case the tradesman or, as the case may be, the customer himself, may program the operation for deducting the balance on the reader 2. Since it is a purchasing operation, the balance can only be decreased. The reader 2 can then compute a new balance taking account of the former balance and of the purchase price of the purchased object. This new balance is then recorded, in place of the former balance in the zone 6, by a re-writing operation. In the same way, taking account of the fact that a new financial banking operation has been performed, the content of the counter 5 is incremented by one unit. If the bearer goes to the bank, the same action is performed. All the same, an additional unit is counted in the counter although the balance has been increased. In practice, it is even possible to decide to modify the content of the counter whenever something has been recorded as a new balance. Once the new balance and the new value of the account have been established. the reader once again prepares a new signature, using the same algorithm. This new signature is evidently different from the previous one since the computation conditions have changed. This new signature is then recorded as a new certificate in the zone 4. As can be seen, the four zones can be read at will. It is even the case that the last three can be modified at will while the counter, however, can only be incremented.

One DES type algorithm is an algorithm of the type published in the "Federal Information Processing Standards Publication", dated 17th Jan. 1977 and updated on 13th Sep. 1983 by the U.S. National Bureau of Standards, pp. 41009 to 41140. This algorithm can be parametrized by a 64-bit key. In the application considered, all the readers used will be provided with one and the same parametrized version of this algorithm. Other algorithms are nevertheless possible.

Somewhat in the manner of the error correction codes in digital processing, the invention provides the recordings with an intrinsic integrity. This means that this system can also be used to convey information of any nature, other than a balance, while making it possible to ascertain that this information has not been unduly modified between its transmission and its reception. The security comes from the complexity of the signature computing algorithm which, besides, is known. The simplification of the invention is provided by the fact that the card does not necessarily have a microprocessor. In stating that the card does not necessarily have a microprocessor, we refer also to applications using microprocessor-based chip cards, but wherein the level of security of the transactions is further increased by the implementation of the system of the invention.

The operations thus described provide for high security since the user seeking to cheat with his card would be incapable of computing a coherent certificate from any counter content, and from a balance that this fraudulent person would, of course, have artificially increased. It is then possible, in the even of failure of the verification of the correspondence between the new signature and the certificate, to provide for noting the specific identity of the card in a memory of the reader 2. It is even possible to decide to block the card itself with a mechanism for the automatic locking of secret codes. This automatic locking mechanism includes, firstly, a counter to count false entries and, secondly, a locking system, the principle of which is based on the non-transmission of the secret code or of the identity, beyond the counting threshold of the counter for false entries.

The payment system of the invention then preferably includes a data service center 10 which periodically enters into communication with all the readers 2 of its network. For example, a report is made every night. During this report, each reader sends the data service center 10 the amounts of the transactions with the accounts of each of the bearers. Furthermore, it also sends a black list of the specific identities of the memories that have caused a failure of the verification of the signatures with their respective certificates. A concatenated black list is then sent, with the same periodicity every night, to all the interaction terminals 2 in such a way that, on the next morning, each of them, in its own memory, knows the list of the identities of the cards to be rejected. It then becomes impossible for the bearer of these cards to use them to perform any operation. To this end, during the first check, the identity of the card is compared with all the prohibited identities contained in the black list.

Should a reader 2 be stolen, it is possible to safeguard it by the use of a memory card 12, called a security card. This security card 12, this time with a microprocessor, must be introduced into the reader. It includes the algorithm DES with a parametrized secret key associated with the system of the invention. When the terminal 2 is turned on, the use of this card, which enables the computation of the money-in-hand certificates, is subjected to the presentation of the bearer code of this card. This bearer code is a code known by the person entitled to use the terminal. It may also be entered by means of the keyboard 9. This card 12 should be permanently present in the reader 2 to make it valid.

Furthermore, given that the list of the operations performed is transmitted every evening to the data service center, it may be considered that any card, the balance of which increased, is a fraudently used card if its bearer cannot show indications and proof of reloading.

Since a reader has to be periodically connected to the data service center 10 in order to continue to be authorized by the network, it will be seen that it is easy for this data service center 10 to ascertain that, during each period, the reader 2 has not performed operations of a prohibited type. For example, a tradesman would not be able to increase balances on cards that are introduced into his reader.

What is claimed is:

1. A system of payment by electronic memory money cards comprising memory money cards and one or more interaction terminals to interact on financial balances recorded in these cards, wherein:

these memory cards include at least four different memorizing zones: an identity zone, a balance zone, an interaction counter zone and a certificate zone, and wherein the terminals include means designed, before each interaction, to:

prepare a signature from the balance, the content of the counter, and the identity, ascertain that this signature corresponds to a certificate recorded in the certificate zone, and wherein this system further includes means designed, at each interaction, to:

modify the balance, increment the content of the interaction counter, prepare a new signature as a function of the new balance, the new content of the interaction counter and the identity, and record the new signature as a new certificate in the certificate zone.

2. A system according to claim 1, wherein the interaction terminals include means to prepare a new signature by application of a DES type algorithm.

3. A system according to either of the claims 1 or 2, wherein the terminals include means for the transmission, to a data service center, of an identity of the memory cards for which the verification of the signature has not corresponded to a signature recorded beforehand in the certificate zone.

4. A system according either of the claims 1 or 2, wherein the terminals include memories for recording and for permanently ascertaining that the identity recorded in a card that is introduced is not on a black list.

5. A system according to either of the claims 1 or 2, wherein the memory zone assigned to the counting of the interactions cannot be decremented.

6. A system for the transfer of information by electronic memory card comprising memory cards and one or more interaction terminals to interact on information recorded in these cards, wherein:

these memory cards include at least four different memorizing zones: an identity zone, an information storage zone, an interaction counter zone and a certificate zone, and wherein the terminals include means designed, before each interaction, to:

prepare a signature from the information stored, the content of the counter, and the identity, and ascertain that this signature corresponds to a certificate recorded in the certificate zone, or wherein this system further includes means designed, at each interaction, to:

modify the stored information;

increment the content of the interaction counter, prepare a new signature as a function of the new balance, the new content of the interaction counter and the identity, and record the new signature as a new certificate in the certificate zone.

* * * * *